(12) United States Patent
Schmidtke et al.

(10) Patent No.: US 7,230,792 B2
(45) Date of Patent: Jun. 12, 2007

(54) MEDIA SELECTION SYSTEMS AND METHODS HAVING A COUPLER FOR SLIDABLY ENGAGING A STORAGE MEDIUM IN A STORAGE SYSTEM

(75) Inventors: Gregg S. Schmidtke, Fort Collins, CO (US); Kelly John Reasoner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 504 days.

(21) Appl. No.: 10/717,794

(22) Filed: Nov. 19, 2003

(65) Prior Publication Data

US 2005/0105208 A1    May 19, 2005

(51) Int. Cl.
*G11B 17/02* (2006.01)
*G11B 23/02* (2006.01)

(52) U.S. Cl. ............... 360/98.06; 360/92; 360/133; 369/30.43; 720/728

(58) Field of Classification Search ............ 360/92, 360/98.06, 133; 369/30.43, 30.44, 30.45, 369/30.33; 720/728
See application file for complete search history.

(56) References Cited

U.S. PATENT DOCUMENTS

| | | | |
|---|---|---|---|
| 4,608,679 A * | 8/1986 | Rudy et al. ............ 369/30.43 |
| 5,687,039 A | 11/1997 | Coffin et al. | |
| 5,777,819 A * | 7/1998 | Tanaka ..................... 360/92 |
| 5,999,500 A | 12/1999 | Mueller | |
| 6,104,564 A * | 8/2000 | Shibuya et al. ............. 360/69 |
| 6,160,786 A * | 12/2000 | Coffin et al. ............ 369/30.43 |
| 6,301,218 B1 * | 10/2001 | Jones .................. 369/178.01 |
| 6,469,850 B2 | 10/2002 | Luffel et al. | |
| 6,476,999 B1 | 11/2002 | Meikle et al. | |
| 6,504,671 B2 * | 1/2003 | Iwabuchi .................... 360/92 |
| 6,512,653 B1 * | 1/2003 | Sasaki et al. ................ 360/92 |
| 6,549,358 B1 | 4/2003 | Billy et al. | |
| 6,570,735 B2 | 5/2003 | Coffin et al. | |
| 6,607,344 B2 | 8/2003 | Ostwald | |
| 6,757,130 B2 * | 6/2004 | Yoshida et al. .............. 360/92 |
| 7,016,144 B2 * | 3/2006 | Yamakawa et al. .......... 360/92 |
| 2005/0036231 A1 * | 2/2005 | Dickey et al. ............... 360/92 |

\* cited by examiner

*Primary Examiner*—Jefferson Evans

(57) ABSTRACT

Media selection systems and methods. A media selection system may comprise a coupler mounted on a plunge assembly of a cartridge retrieving device. The coupler slidably engages a storage medium as the cartridge retrieving device moves relative to the storage medium. A method may comprise slidably engaging a storage medium with a cartridge retrieving device as the cartridge retrieving device moves relative to the storage medium.

19 Claims, 5 Drawing Sheets

MEDIA SELECTION SYSTEMS AND METHODS HAVING A COUPLER FOR SLIDABLY ENGAGING A STORAGE MEDIUM IN A STORAGE SYSTEM

TECHNICAL FIELD

The invention generally pertains to media storage systems, and more specifically, to media selection systems and methods.

BACKGROUND

Media storage systems are commonly used to store large volumes of computer-readable data on removable storage media, such as magnetic tape cartridges and optical storage media, to name only a few examples. Such storage systems may include one or more storage devices with storage locations for the storage media. One or more data access devices may also be included for read and/or write operations on the storage media.

Media storage systems may also include cartridge retrieving devices, also referred to as picker assemblies, which are operable to retrieve and transport the storage media in the storage system. For example, the picker assembly may be used to deliver storage media to the data access device for read and/or write operations. The picker assembly may also be operated to return the storage media to a storage location following the read and/or write operation.

The picker assembly may include a plunge assembly that is configured with a finger that extends under a storage medium and engages an indentation or notch formed on the surface of a storage medium. However, this configuration requires operational clearance, increasing the size of media storage systems. The plunger also requires many moving components (e.g., spring-loaded rotating finger and splaying assembly).

SUMMARY

Implementations of a system may comprise a coupler mounted on a plunge assembly of a cartridge retrieving device, the coupler slidably engaging a storage medium as the cartridge retrieving device moves relative to the storage medium.

Implementations of a method may comprise slidably engaging a storage medium with a cartridge retrieving device as the cartridge retrieving device moves relative to the storage medium.

DETAILED DESCRIPTION

Figure 1:
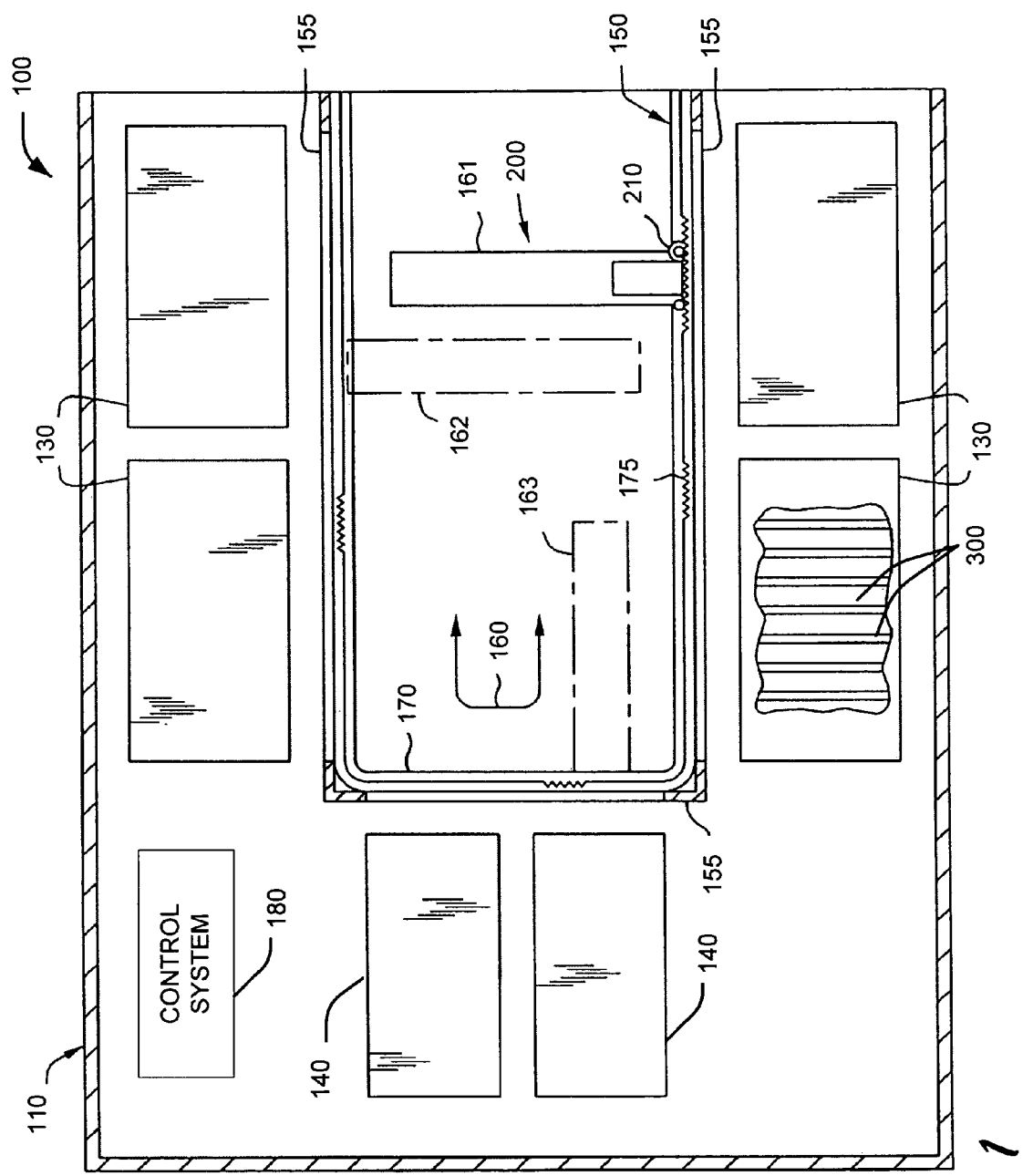
FIG. 1 is a top plan view of an exemplary storage system.

Referring to FIG. 1, exemplary implementations of a media selection system may be used to retrieve and transport one or more storage medium 300 (shown in more detail in FIG. 3) in a storage system 100, for example, between a storage location 130 and a data access device 140. An exemplary media selection system may include a cartridge retrieving device or picker assembly 200, shown in more detail in FIG. 2. Picker assembly 200 may include a plunge assembly 240 movable between a retracted position and an extended position. A coupler 270 is mounted on the plunge assembly 240.

In operation, the plunge assembly 240 may be extended to position the coupler 270 adjacent a storage medium 300. Coupler 270 slidably engages a storage medium 300 (see e.g., FIGS. 4a and b). The storage medium 300 may then be loaded into the picker assembly 200. Cartridge selection system may be similarly operated to eject and release the storage medium 300 (e.g., at an intended destination).

Exemplary System

Looking to FIG. 1, storage system 100 may include one or more libraries 110. The libraries 110 may be modular (e.g., configured to be stacked one on top of the other), allowing the storage system 100 to be readily expanded. The library 110 is configured to store computer readable data on one or more storage medium 300, such as magnetic data cartridges, optical media, and disk drives, to name only a few examples.

The storage medium 300 may be provided in one or more storage locations 130. In an exemplary implementation, the storage medium 300 may be stored in one or more removable storage magazines having a plurality of storage locations. The storage locations may be arranged in the library 110 as shown in FIG. 1, although other arrangements are also possible.

One or more data access devices 140 may also be provided for read and/or write operations. In one exemplary implementation, each library 110 is provided with at least one data access device 140. However, in other implementations data access devices 140 do not need to be included with each library 110 in a storage system 100.

It is noted that although the storage system 100 is shown in FIG. 1 according to a particular configuration, other suitable configurations are also contemplated as being within the scope of the invention. In addition, the number of libraries, and the number of storage locations and data access devices provided with each library, may depend upon various design considerations. Such considerations may include, but are not limited to, the frequency with which data is accessed. Still other considerations may include, by way of example, the physical dimensions of the library, the storage locations, and/or the data access devices.

As mentioned above, the storage system 100 may also include at least one picker assembly 200. The picker assembly 200 is adapted to engage a storage medium 300, withdraw the storage medium 300 (e.g., from one of the storage locations 130), transport the storage medium 300, and eject the storage medium 300 at an intended destination (e.g., data access device 140 for a read and/or write operation).

Picker assembly 200 may be mounted to a guide system 150 in the storage system 100. In one implementation, the guide system 150 may be mounted in a translate frame 155 that moves the picker assembly 200 between vertically stacked libraries 110. In any event, guide system 150 defines a horizontal displacement path (illustrated by arrows 160) adjacent the storage locations 130 and the data access device(s) 140.

For purposes of illustration, picker assembly 200 is shown in FIG. 1 as it may be moved through displacement path 160 to positions 161, 162, and 163. The picker assembly 200 is positioned adjacent the storage locations 130 at positions 161, and 162, and adjacent one of the data access devices 140 at position 163.

In one exemplary implementation, the guide system 150 may comprise a railing 170 and a gear track 175. Picker assembly 200 may be movably mounted to the railing 170. The picker assembly 200 also includes gears 210 (shown in more detail in FIG. 2) that cooperate with gear track 175 to move the picker assembly 200 through displacement path 160 on the guide system 150.

A control system 180 may be operatively associated with the picker assembly 200 to control movement of the picker assembly 200 in the storage system 100. For example, control system 180 may establish a communications link (e.g., via RF communication) with a controller (not shown) at the picker assembly 200.

An exemplary control system 180 may include a processor (or processing units) and control software and/or firmware. The control system 180 is operable to process computer-readable instructions, for example, computer data signals embodied in one or more carrier waves. The computer-readable instructions may be received from a network computer, user interface provided as part of a storage system, or a system memory. Control system 180 may position the picker assembly 200 in the storage system 100 based on these computer-readable instructions.

Figure 2:
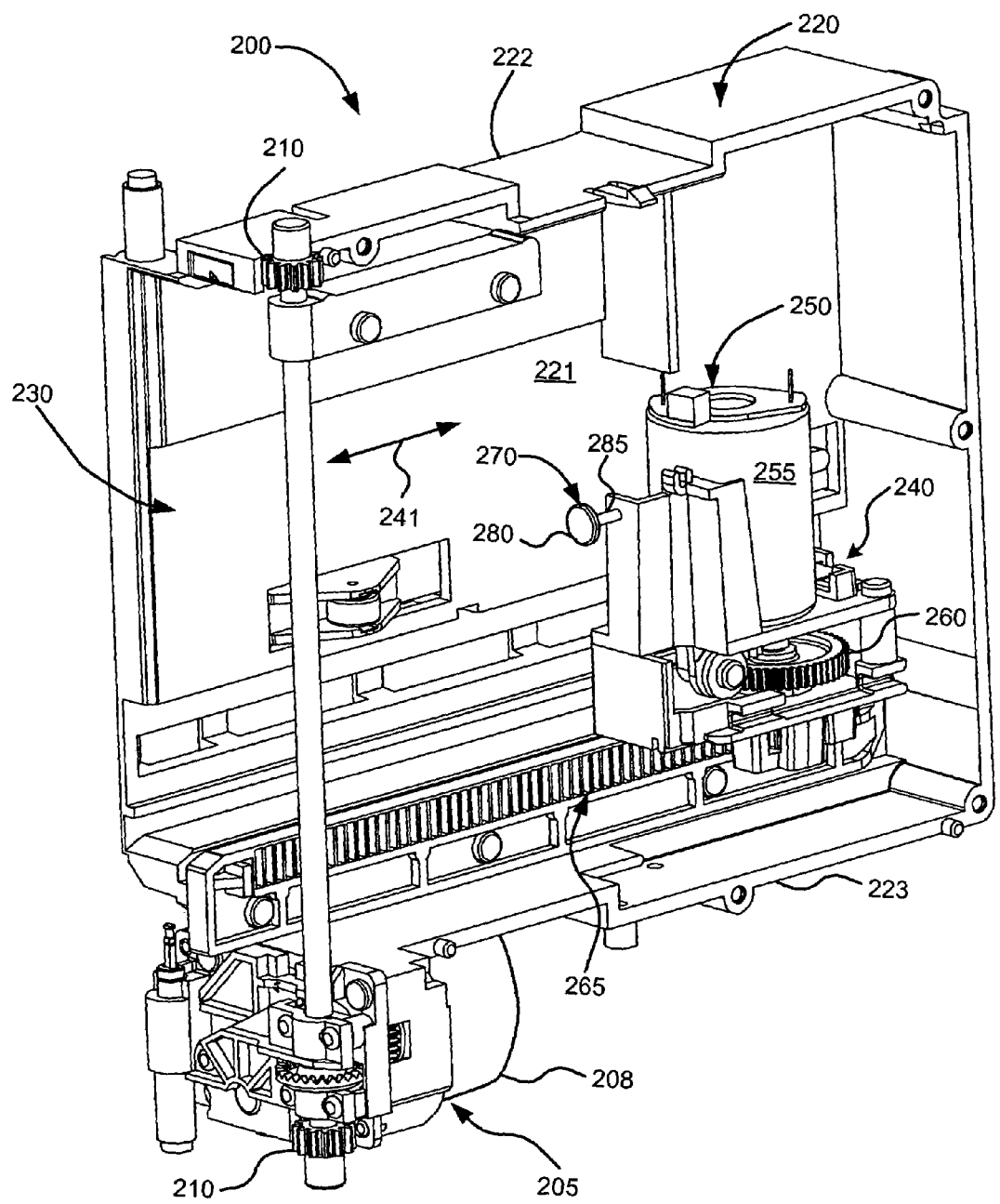
FIG. 2 is a perspective view of an exemplary picker assembly with a side panel removed so that the interior chamber of the picker assembly is visible.

FIG. 2 is a perspective view of an exemplary picker assembly 200 with a side panel removed so that the interior chamber of the picker assembly 200 is visible for purposes of the following discussion. The picker assembly 200 may include an actuator 205 having a drive motor 208 and gears 210. Actuator 205 is operable to move the picker assembly 200 through displacement path 160 on guide system 150, as discussed above with reference to FIG. 1.

The picker assembly 200 may include a housing 220 having side panels 221 (the opposite side panel is removed in FIG. 2 for purposes of illustration), top wall 222, and bottom wall 223. Housing 220 defines a cavity or chamber 230 sized to receive storage medium 300 therein for transport in the storage system 100 (e.g., between storage locations and data access devices).

A plunge assembly 240 is movably mounted to picker assembly 200 in the chamber 230. Plunge assembly 240 may be extended and retracted (e.g., in the directions illustrated by arrows 241). Movement of the plunge assembly 240 may be achieved via an actuator 250 including a drive motor 255 and gear assembly 260. For example, drive motor 255 may operate the gears 260 in cooperation with gear track 265 provided on the housing 220 of picker assembly 200.

The plunge assembly 240 may include a coupler 270. Coupler 270 may be mounted to the plunge assembly 240. Coupler 270 is configured to engage storage medium 300 during loading operations, and to release storage medium 300 during unloading operations (see e.g., FIGS. 4a and b).

In one exemplary implementation, coupler 270 may include a head portion 280 on a neck portion 285. Although coupler 270 is shown in FIG. 2 having a disc-shaped head portion 280 and cylindrical neck portion 285, coupler 270 is not limited to any particular geometry. Coupler 270 is operable to engage a mating coupler on a storage medium 300.

Figure 3:
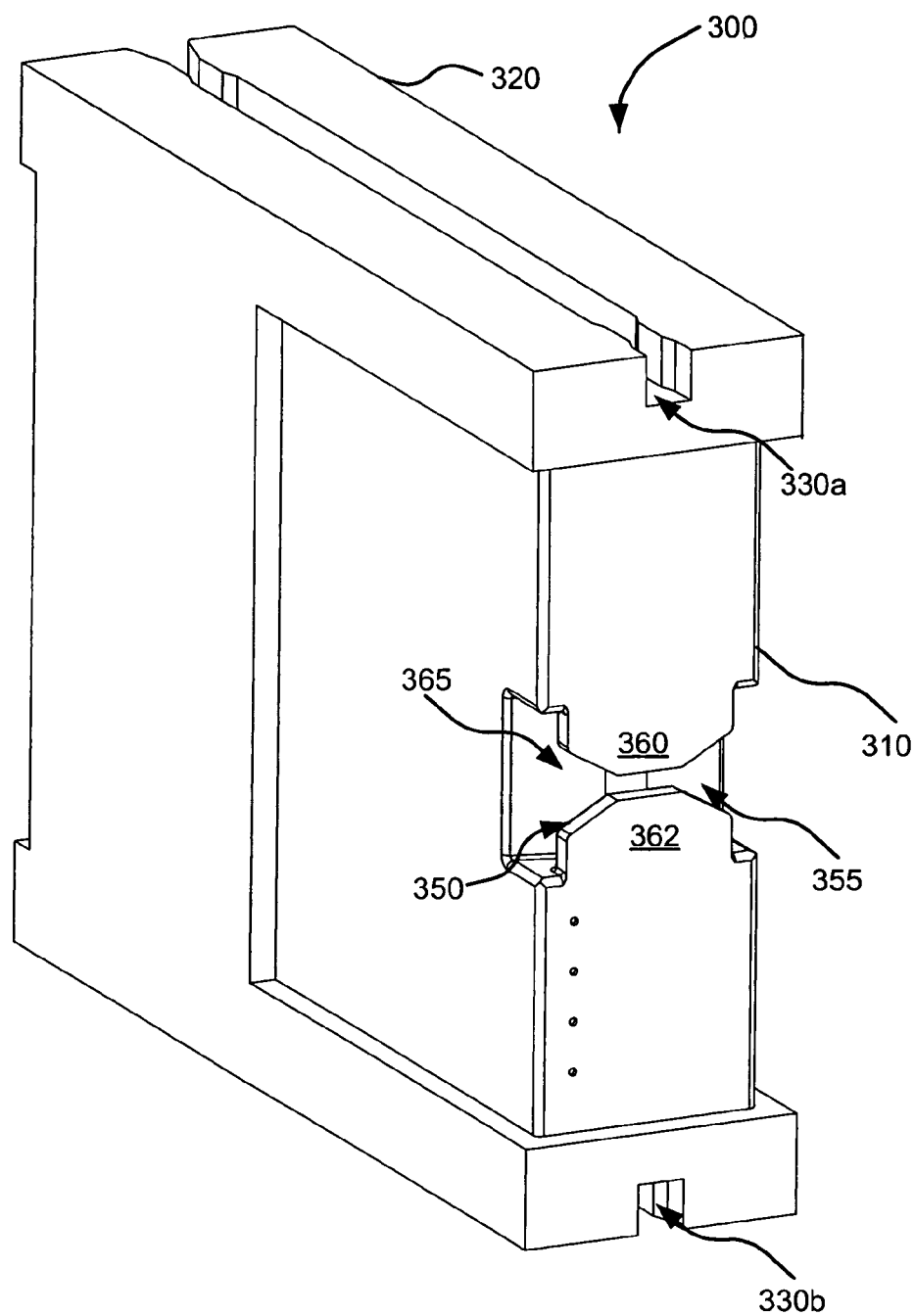
FIG. 3 is a perspective view of an exemplary storage medium.

FIG. 3 is a perspective view of an exemplary storage medium 300. Exemplary storage medium 300 is implemented as a movable hard disk drive 310, such as, e.g., a serial advanced technology attachment (ATA) hard disk drive. Hard disk drive storage provides low-cost, high capacity, fast data access. However, it should be noted that any suitable storage media may be used according to the teachings of the invention. For example, storage media may also include, without limitation, magnetic tape cartridges and/or optical storage media.

Referring to FIG. 3, an implementation of storage medium 300 may include a housing 320 with guide channels 330a and 330b (hereinafter generally 330) formed therein. Guide channels 330 may cooperate with mating guides (e.g., fins, not shown) that may be provided in the storage locations and data access devices to align and retain the storage medium 300 therein.

Storage medium 300 may also be configured with a connector (not shown) to link the hard disk drive 310 to a data access device for a read and/or write operation. The connector may include multiple pins for data transfer, power, and ground. In addition, the connector may be a "hot swappable" connector so that the hard disk drive 310 can be readily connected without having to power down the data access device.

An exemplary connector may be implemented as a single connector attachment (SCA), such as those used in redundant array of independent disks (RAID) storage systems. SCA connectors provide a 68-pin data connection, 4-pin power connection, and configuration jumpers on a single 80-pin connector. However, the connector is not limited to any particular implementation. Mating connectors may also be provided with the data access device, such as, e.g., on a backplane.

Figure 4A:
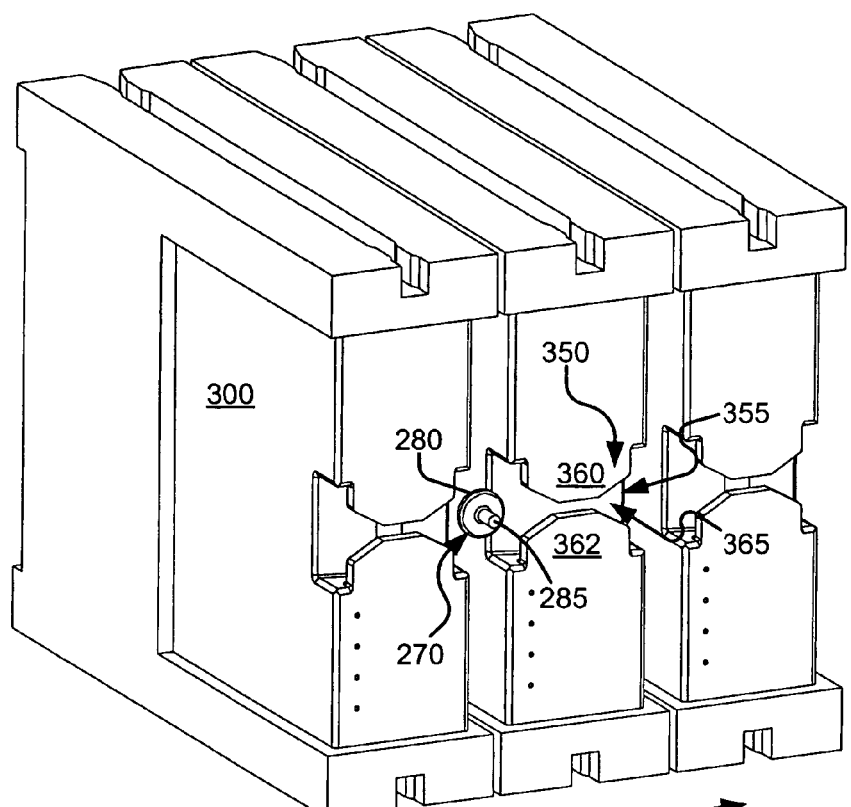
FIGS. 4a and b are perspective views of storage media illustrating engagement and disengagement by a coupler.

Exemplary storage medium 300 also includes a mating coupler 350 that is configured to be engaged by the coupler 270 on plunge assembly 240 (see e.g., FIGS. 4a and b). An exemplary mating coupler 350 may include upper and lower tab portions 360, 362. The upper tab portion 360 and the lower tab portion 362 define a channel 355 therebetween. Channel 355 also includes an enlarged area 365 formed behind the tab portions 360, 362 in the storage medium 300.

FIGS. 4a and b are perspective views of exemplary storage media illustrating engagement and disengagement by a coupler 270. When picker assembly 200 is positioned adjacent a desired storage medium 300, the plunge assembly is extended to position the coupler 270 adjacent the mating coupler 350. The plunge assembly 240 on which coupler 270 may be mounted is not shown in FIGS. 4a and b to better illustrate the coupler 270 engaging and disengaging the storage medium 300.

Figure 4B:
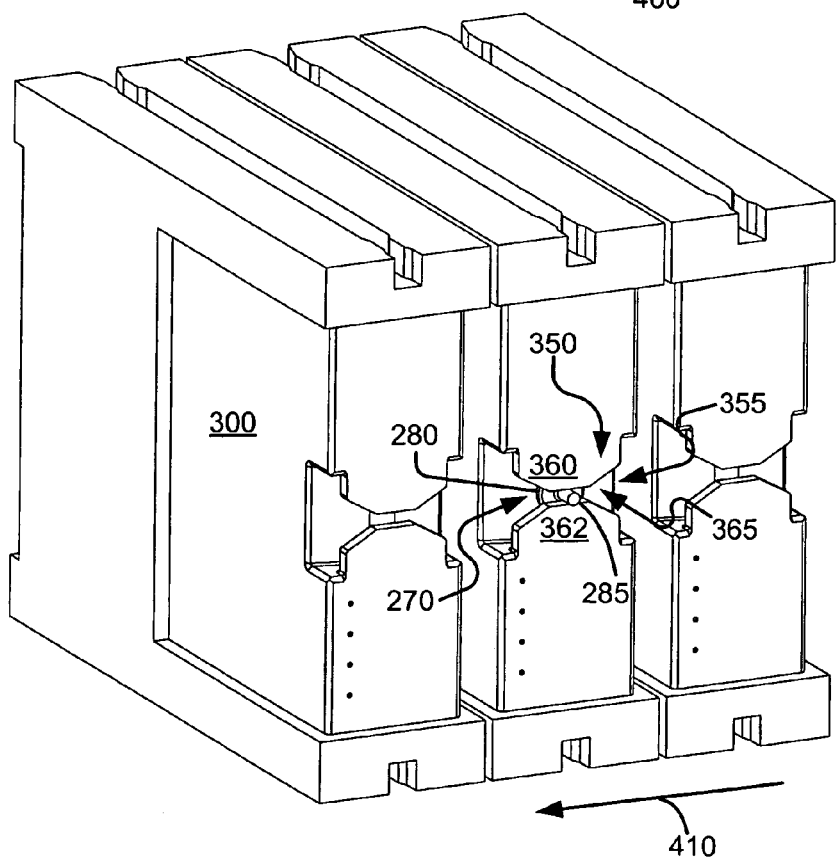

When the coupler 270 is positioned adjacent the desired storage medium 300, as shown in FIG. 4a, picker assembly 200 may be moved along guide rail 170 in the storage library 110, as discussed above with reference to FIG. 1. Alternatively, the storage medium 300 may be moved adjacent the picker assembly 200 (e.g., a storage drum may be rotated). In any event, the movement of the picker assembly 200 and/or storage medium 300 causes coupler 270 to slide into channel 355 (e.g., in the direction illustrated by arrow 400). Neck portion 285 extends into the channel 355 between tab portions 360, 362 and positions head portion 280 in the enlarged area 365 formed behind the tab portions 360, 362, as shown in FIG. 4b. Similarly, the coupler 270 may be disengaged from the mating coupler 350 by moving the coupler 270 relative to the storage medium 300 in the direction illustrated by arrow 410 in FIG. 4*b*. Operation of the media selection system will be described in more detail below.

Before continuing, it should be noted that the foregoing description of exemplary media storage system 100, picker assembly 200, and storage medium 300 is provided in order to better understand one environment in which the invention may be used. However, the media selection system may be implemented in any of a wide range of other media storage systems, and in conjunction with a wide range of other picker assemblies and storage media that are now known or that may be developed in the future. Consequently, implementations in accordance with the invention should not be regarded as being limited to use with any particular media storage system.

Exemplary Operation

In an exemplary operation, control system 180 may receive a request to access one or more of the storage media. For purposes of illustration, a request may be received from a network computer (not shown) to access data on one or more of the storage media in the storage system 100. Alternatively, a request may be received as part of an inventory or reorganization operation (e.g., from a system memory).

In response, control system 180 may communicate with the picker assembly 200 to position it adjacent the desired storage medium 300. Referring to FIG. 1, for example, gears 210 cooperate with the gear track 175 and causes the picker assembly 200 to move through displacement path 160 in library 110. When the picker assembly 200 is positioned adjacent the requested storage medium 300, picker assembly 200 may be operated to withdraw the storage medium 300 and load it into the picker assembly 200.

Figure 5A:
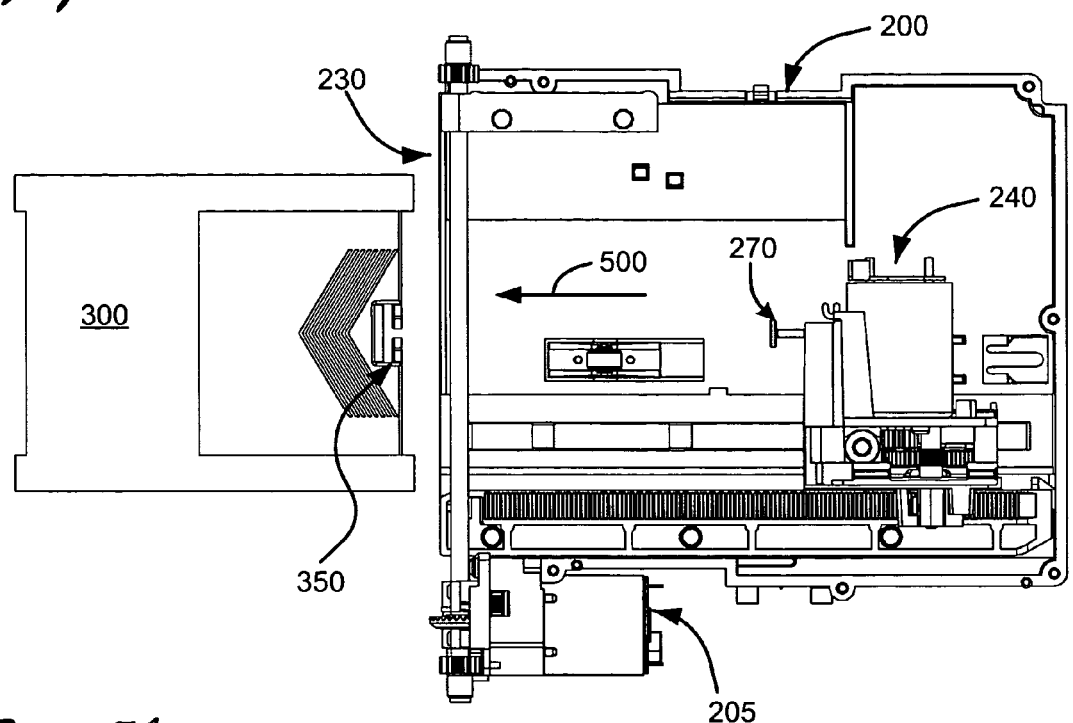
FIGS. 5a and b are simplified, side elevation views of a picker assembly positioned adjacent a storage medium illustrating exemplary loading and unloading operations.
Figure 5B:
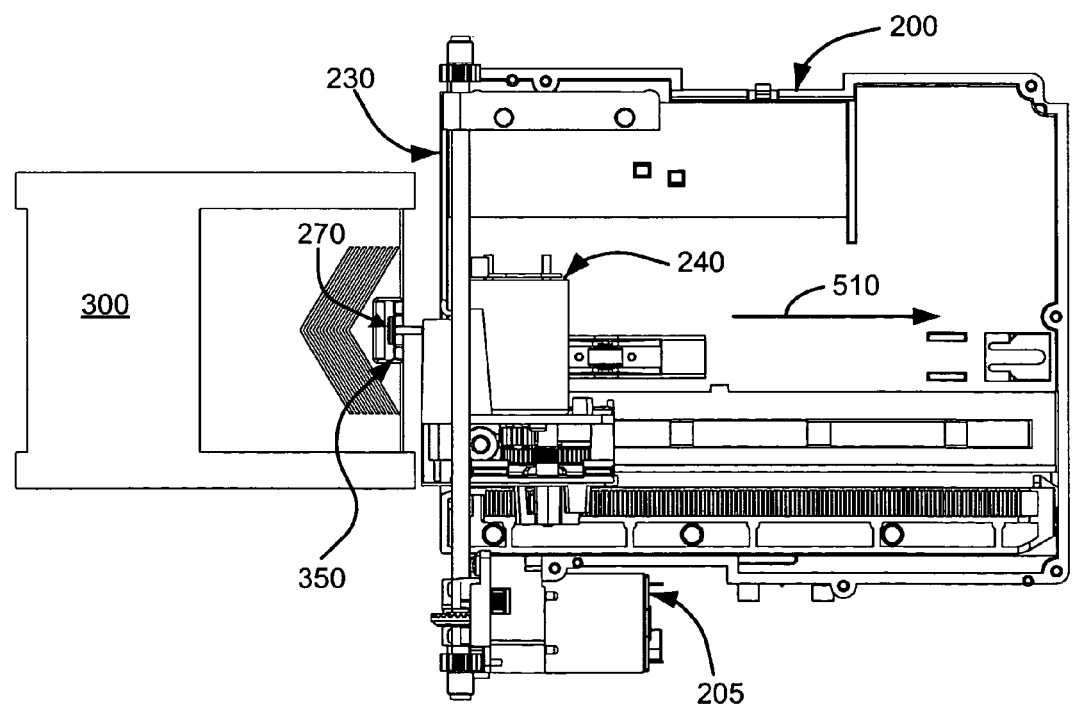

FIGS. 5*a* and *b* are simplified, side elevation views of a picker assembly 200 positioned adjacent a storage medium 300 illustrating exemplary loading and unloading operations of the media selection system. In an exemplary loading operation, the plunge assembly 240 may be moved in the direction illustrated by arrow 500 until it is at or near its fully extended position, as illustrated in FIG. 5*b*. Accordingly, coupler 270 is positioned adjacent mating coupler 350 on the storage medium 300 (see e.g., FIG. 4*a*). The picker assembly 200 and storage medium 300 is then moved relative to one another until the coupler 270 on the picker assembly 200 engages the mating coupler 350 on storage medium 300 (see e.g., FIG. 4*b*).

As discussed above, this movement causes neck portion 285 to slide between tab portions 360, 362 and positions head portion 280 in the enlarged area 365 of channel 355 behind tab portions 360, 362 (see e.g., FIGS. 4*a* and *b*). Accordingly, the coupler 350 is in an engaged position with the head portion 280 behind the tab portions 360.

The storage medium 300 may then be withdrawn by reversing the direction of the plunge assembly 240, generally in the direction of arrow 510 illustrated in FIG. 5*b*. As the plunge assembly 240 is retracted, the engaged storage medium 300 is withdrawn (e.g., from a storage location or data access device) and received within the chamber 230 of picker assembly 200. The plunge assembly 240 continues to retract until the engaged storage medium 300 is received within the chamber 230 of the picker assembly 200 by an amount sufficient to allow the picker assembly 200 to move in the storage system 100.

The picker assembly 200 may then be operated to transport the storage medium 300 in the storage system 100. For example, picker assembly 200 may be moved through displacement path 160 illustrated in FIG. 1 and/or between stacked libraries 110. In any event, the picker assembly 200 is positioned adjacent an intended destination, such as a data access device. The picker assembly 200 may then be operated to eject the storage medium 300.

An exemplary unloading operation is also described with reference to FIGS. 5*a* and *b*. The plunge assembly 240 may be moved in the direction of arrow 500 in FIG. 5*a* to eject the storage medium 300 from picker assembly 200. For example, the storage medium 300 may be unloaded into a data access device for a read and/or write operation.

The storage medium 300 may be released by the relative movement of the picker assembly 240 and storage medium 300 so that neck portion 285 slides between tab portions 360, 362. Accordingly, head portion 280 slides out from behind the tab portions 360, 362 in the direction illustrated by arrow 410 (FIG. 4*b*) so that the coupler 270 is in the position shown in FIG. 4*a*. Accordingly, the coupler 270 is released from the storage medium 300 and the plunge assembly 240 may be retracted into chamber 230.

During a read and/or write operation, the picker assembly 200 may be used to retrieve and/or transport other storage media in the storage system 100. Following the read and/or write operation, the picker assembly 200 may be returned to the data access device 140, for example, if the picker assembly 200 has been moved elsewhere in the library 110. The picker assembly 200 may then be operated to engage and load the storage medium 300, as discussed above, and transport the storage medium 300 to another location in the storage system (e.g., a storage location).

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A media selection system comprising a coupler mounted on a plunge assembly of a cartridge retrieving device, the coupler slidably engaging a channel formed behind a tab portion of a storage medium as the cartridge retrieving device moves relative to the storage medium.

2. The system of claim 1, wherein the cartridge retrieving device moves relative to the storage medium by moving the cartridge retrieving device.

3. The system of claim 1, wherein the cartridge retrieving device moves relative to the storage medium by moving the storage medium.

4. The system of claim 1, wherein the cartridge retrieving device moves relative to the storage medium by moving both the cartridge retrieving device and the storage medium.

5. The system of claim 1, further comprising a mating coupler provided on the storage medium, the coupler engaging the mating coupler.

6. The system of claim 1, wherein the coupler includes a disc-shaped head portion, the disc-shaped head portion sliding into a channel formed behind tab portions on the storage medium to engage the storage medium.

7. The system of claim 1, wherein the coupler includes a neck portion and a head portion, the neck portion moving the head portion into an enlarged channel formed on the storage medium to engage the storage medium.

8. The system of claim 1, wherein the storage medium is selected from the group consisting of removable hard disk drives, optical media, and magnetic tape media.

9. The system of claim 1, further comprising a control system operatively associated with the cartridge retrieving device to control movement of the cartridge retrieving device.

10. The system of claim 1, further comprising a control system to position the cartridge retrieving device based on computer-readable instructions.

11. The system of claim 1, wherein the coupler is mounted stationary on the plunge assembly.

12. A media selection system comprising a coupler mounted on a plunge assembly of a cartridge retrieving device, the coupler slidably engaging a storage medium as the cartridge retrieving device moves relative to the storage medium, wherein the coupler includes a head portion, the head portion sliding into a channel formed behind tab portions on the storage medium to engage the storage medium.

13. A method comprising:
    moving a cartridge retrieving device proximate a storage medium in a storage system;
    sliding a coupler into a channel formed behind a tab on the storage medium;
    slidably engaging the storage medium with the coupler extending from the cartridge retrieving device as the cartridge retrieving device moves relative to the storage medium; and
    transporting the storage medium in the storage system with the cartridge retrieving device.

14. The method of claim 13, further comprising moving the coupler on the cartridge receiving device out of a partially enclosed channel formed in the storage medium to disengage the storage medium.

15. The method of claim 13, further comprising releasing the storage medium as the coupler of the cartridge retrieving device slides out of engagement with the channel being at least partially enclosed in the storage medium.

16. The method of claim 13, further comprising engaging a disc-shaped head of the coupler with the channel formed in the storage medium.

17. The method of claim 13, wherein engaging a storage medium comprises sliding a disc-shaped coupler on the cartridge receiving device into an enlarged area formed behind a portion of a housing of the storage medium.

18. A system comprising:
    means for transporting a storage medium in a storage system; and
    means for slidably engaging a storage medium as the means for transporting the storage medium moves relative to the storage medium in the storage system.

19. The system of claim 18, further comprising means for slidably releasing the storage medium as the means for transporting the storage medium moves relative to the storage medium in the storage system.

* * * * *